United States Patent
Hsiao et al.

(10) Patent No.: US 10,839,006 B2
(45) Date of Patent: Nov. 17, 2020

(54) MOBILE VISUAL SEARCH USING DEEP VARIANT CODING

(71) Applicant: Yahoo Holdings, Inc., Sunnyvale, CA (US)

(72) Inventors: JenHao Hsiao, Taipei (TW); Jia Li, Santa Clara, CA (US)

(73) Assignee: Oath Inc., New York, NY (US)

( * ) Notice: Subject to any disclaimer, the term of this patent is extended or adjusted under 35 U.S.C. 154(b) by 228 days.

(21) Appl. No.: 14/715,246

(22) Filed: May 18, 2015

(65) Prior Publication Data

US 2016/0342623 A1     Nov. 24, 2016

(51) Int. Cl.
     *G06F 16/583*      (2019.01)

(52) U.S. Cl.
     CPC .................. *G06F 16/583* (2019.01)

(58) Field of Classification Search
     CPC ................................. G06F 17/30247
     See application file for complete search history.

(56) References Cited

U.S. PATENT DOCUMENTS

| | | | | |
|---|---|---|---|---|
| 9,384,227 B1 * | 7/2016 | Xiao | ............... | G06F 17/30584 |
| 9,485,118 B1 * | 11/2016 | Atlas | ............... | H04L 47/10 |
| 2002/0178410 A1 * | 11/2002 | Haitsma | ............ | G06F 17/30787 |
| | | | | 714/709 |
| 2005/0254502 A1 * | 11/2005 | Choi | ............... | H04L 12/56 |
| | | | | 370/395.32 |
| 2009/0324077 A1 * | 12/2009 | Wu | ............... | G06F 17/30247 |
| | | | | 382/170 |
| 2013/0254191 A1 * | 9/2013 | He | ............... | G06F 17/3053 |
| | | | | 707/728 |
| 2013/0279806 A1 * | 10/2013 | Tonisson | ............ | G06T 7/2033 |
| | | | | 382/173 |
| 2015/0227796 A1 * | 8/2015 | Holzschneider | .. | G06F 17/30256 |
| | | | | 382/103 |

* cited by examiner

*Primary Examiner* — Mark D Featherstone
*Assistant Examiner* — Tony Wu
(74) *Attorney, Agent, or Firm* — Pillsbury Winthrop Shaw Pitman LLP (57) ABSTRACT

An approach for performing mobile visual search uses deep variant coding of images to reduce the amount of data transmitted from mobile devices to a search server and to provide more efficient indexing and searching on the search server. The amount of data used to represent an image varies depending upon the content of the image and is less than conventional fixed bit length hashing approaches. Denser regions of a feature space are represented by more encoding bits and sparser regions of the feature space are represented by fewer encoding bits, so that the overall number of encoding bits for an image feature is reduced. The approach generally involves determining a set of hash functions that provide deep hashing with more evenly-distributed hash buckets. One or more additional hash functions may be selectively generated for particular hash buckets that contain more than a specified number of images.

13 Claims, 8 Drawing Sheets

100

| Approach | Data transmitted (KB) |
|---|---|
| Upload JPEG image (400*400 resolution) | 100~400 KB |
| Upload SIFT Feature (500 points, 128 dimension) | 256 KB *1 |
| Upload DVC code (200 hash functions & 1 hash tables) | 0.025 KB *2 |
| Upload DVC code (200 hash functions & 10 hash tables) | 0.25 KB |

*1. 500 * 128 * 32 = 2048000 bits = 256 KB
*2. 200 * 1 = 200 bits = 0.025 KB

FIG. 1

| Approach | Data transmitted (KB) |
|---|---|
| Upload JPEG image (400*400 resolution) | 100~400 KB |
| Upload SIFT Feature (500 points, 128 dimension) | 256 KB *1 |
| Upload DVC code (200 hash functions & 1 hash tables) | 0.025 KB *2 |
| Upload DVC code (200 hash functions & 10 hash tables) | 0.25 KB |

*1. 500 * 128 * 32 = 2048000 bits ≈ 256 KB
*2. 200 * 1 = 200 bits ≈ 0.025 KB

FIG. 2

FIG. 3B
Server Side

350 →

- 352 — Receive a Search Query from a Mobile Device That Includes a Set of Two or More Hash Bits
- 354 — Use Set of Two or More Hash Bits to Identify Particular Hash Bucket
- 356 — Identify One or More Other Images That Belong to the Particular Hash Bucket
- 358 — Optionally Identify Which of the One or More Images are Most Similar to the Image
- 360 — Generate and Transmit Search Results to Mobile Device

FIG. 3A
Client Side

300 →

- 302 — Obtain Image
- 304 — Process Image Data for Image Using Plurality Of Hash Functions to Obtain Set of Two or More Hash Bits
- 306 — Generate Search Query that Includes the Set of Two or More Hash Bits
- 308 — Transmit Search Query to Search Process
- 310 — Receive and Display Search Results

FIG. 4

Deep Variant Coding (DVC) 406

$h(x) = \text{sign}(W^T x - t)$ $$\max_{w,t} \left[ w^T \sum w - \lambda(w^T w - 1) \right]$$

DVC Hash Bits 408

011011 — image 1
11001101 — image 2
110 — image 3
...

Deep Neural Network 404

4096 (Dimensions/Features) * 32 bits (per Dimension/Feature)

Image Data 402

FIG. 10 though the embodiments may be practiced without these specific details. In other instances, well-known structures and devices are shown in block diagram form in order to avoid unnecessarily obscuring the embodiments. Various aspects of embodiments are described hereinafter in the following sections:

MOBILE VISUAL SEARCH USING DEEP VARIANT CODING

FIELD

Embodiments relate generally to mobile visual search and more specifically, to a mobile visual search approach that uses deep variant coding of images.

BACKGROUND

The approaches described in this section are approaches that could be pursued, but not necessarily approaches that have been previously conceived or pursued. Therefore, unless otherwise indicated, the approaches described in this section may not be prior art to the claims in this application and are not admitted to be prior art by inclusion in this section.

Many mobile devices include the capability to perform mobile visual search, in which an image captured by a mobile device is transmitted as a query image to a search server to obtain similar images. For example, a user may use a mobile device to acquire an image of an object and then use an application to request images of similar objects, which may include objects for sale by vendors. One conventional approach involves transmitting the query image in a compressed format to a search server where feature extraction and searching is performed. One of the problems with this approach is that it involves sending a large amount of data from the mobile device to the search server, for example, several hundred kilobytes or even megabytes of data, which can lead to unfavorable user experiences in low bandwidth environments. Another conventional approach is for a mobile device to process a query image to extract features and then transmit feature information to a search server that searches for similar images using the feature information provided in the search query. This approach is computationally expensive, however, and is therefore not well suited for many mobile devices that have limited computational and storage resources. Yet another approach is for a mobile device to download image data from a search server and perform the search for similar images. This approach is only practical for very small data sets and is not practical for ecommerce applications because of the large amount of data involved.

BRIEF DESCRIPTION OF THE DRAWINGS

In the figures of the accompanying drawings like reference numerals refer to similar elements.

DETAILED DESCRIPTION

In the following description, for the purposes of explanation, numerous specific details are set forth in order to provide a thorough understanding of the various embodiments. It will be apparent, however, to one skilled in the art that the embodiments may be practiced without these specific details. In other instances, well-known structures and devices are shown in block diagram form in order to avoid unnecessarily obscuring the embodiments. Various aspects of embodiments are described hereinafter in the following sections:

I. OVERVIEW
II. ARCHITECTURE
III. DEEP VARIANT CODING (DVC) FRAMEWORK
  A. Overview
  B. Deep Neural Network
    1. Training
    2. Deep Feature Extraction
  C. Deep Variant Coding (DVC)
    1. Uniform Data Projection for w
    2. Variant-Length Coding
    3. Multi-Hash Tables and Multi-Probing
IV. IMPLEMENTATION MECHANISMS I. Overview An approach for performing mobile visual search uses deep variant coding of images to reduce the amount of data transmitted from mobile devices to a search server and to provide more efficient indexing and searching on the search server. The amount of data, i.e., the number of bits, used to represent an image varies depending upon the content of the image and is less than conventional fixed bit length hashing approaches. Denser regions of a feature space are represented by more encoding bits and sparser regions of the feature space are represented by fewer encoding bits, so that the overall number of encoding bits for an image feature is reduced, which provides better performance in mobile environments. The approach generally involves determining a set of hash functions that provide deep hashing with more evenly-distributed hash buckets. For example, an iterative process, such as principle component analysis may be used to determine a set of hash functions that provides the greatest amount of mathematical variance, i.e., "spread", for the corresponding hash buckets to enhance search accuracy. One or more additional hash functions may be selectively generated for particular hash buckets that contain more than a specified number of images. A mobile device processes image data for an image using the set of hash functions to generate a set of bits that represent the image. The set of bits is included in a search query that is transmitted to a search process, for example, at a search server. The search process uses the set of bits included in the search query to identify a particular hash bucket from a plurality of hash buckets that corresponds to the image. The search process identifies one or more other images that are associated with the particular hash bucket and causes search results that identify the one or more other images to be transmitted to the mobile device.

Figure 1:
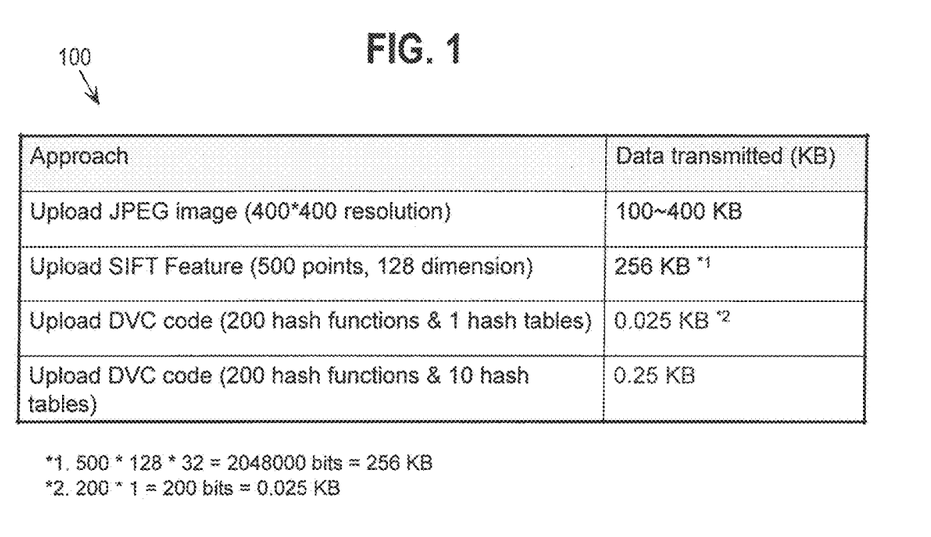
FIG. 1 is a table that depicts example amounts of data required to transmit an image for mobile visual search according to different methods.

FIG. 1 is a table 100 that depicts example amounts of data required to transmit an image for mobile visual search according to different methods. The first approach uploads a 400×400 JPEG image and requires approximately 100-400 Kilobytes of data. The second approach detects and transmits local features of an image, for example, using a scale invariant feature transform (SIFT), and requires approximately 256 Kilobytes for 500 keypoints and 128 dimensions. The third approach uses deep variant coding, as described herein, with 200 hash functions and 1 hash table, and requires 0.025 Kilobytes. The fourth approach uses deep variant coding with 200 hash functions and 10 hash tables, and requires 0.25 Kilobytes. As depicted in table 100, using deep variant coding as described herein significantly reduces the amount of data that is transmitted from a mobile device to a search server when performing mobile visual search. The approach also significantly outperforms conventional visual search systems, such as bag of words via a vocabulary tree. In addition, deep variant coding representations require fewer computational and storage resources to compute and are easily implemented on mobile devices and may be used with different types of local features, hashing algorithms and image databases.

II. Architecture

Figure 2:
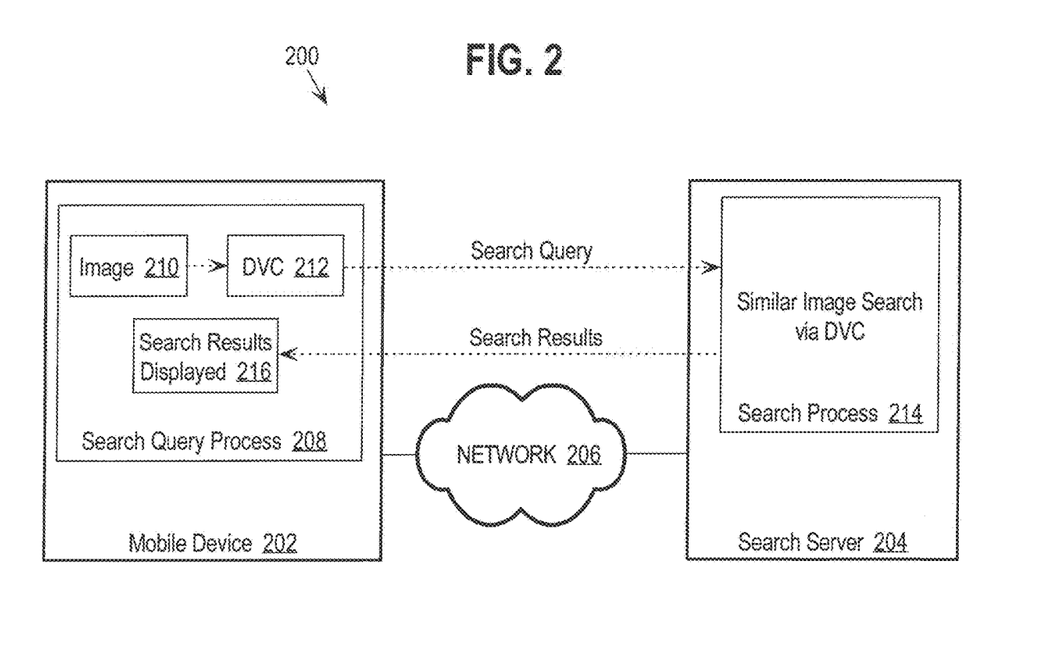
FIG. 2 depicts an example arrangement on which embodiments may be implemented.

FIG. 2 depicts an example arrangement 200 on which embodiments may be implemented. A mobile device 202 and a search server 204 are communicatively coupled via a network 206. Network 206 is depicted in FIG. 2 as a single network for purposes of discussion only, and network 206 may include any number of wired and wireless networks and other network elements that may vary depending upon a particular implementation. Mobile device 202 may be implemented by any type of mobile device that may vary depending upon a particular implementation. Example implementations of mobile device 202 include, without limitation, a smart phone, a tablet computing device, a laptop computing device, and a personal digital assistant. Search server 204 may be implemented by computer hardware, computer software, or any combination of computer hardware and computer software.

Mobile device 202 includes a search query process 208 for generating search queries using deep variant coding. Search query process 208 may be a stand-alone process on mobile device 202 or may be part of another process executing on mobile device 202. A user of mobile device 202 obtains an image 210 to be used for a search, for example, via a camera (not depicted) on mobile device 202, or from a source external to mobile device 202. The image 210 is processed using deep variant coding (DVC) 212 to generate a DVC bit stream that is included in a search query. Search query process 208 causes the search query to be transmitted, for example as part of a mobile visual search request, to search server 204. Search server 204 includes a search process 214 that receives and processes the search query using deep variant coding to identify one or more images that are similar to image 210. Search process 214 generates search results that identify and/or include the one or more images determined to be similar to image 210 using deep variant coding. The search results are returned by search server 204 to mobile device 202 and the search query process 208 causes the search results to be displayed 216 on mobile device 202. Mobile device 202 and search server 204 may include various other elements that may vary depending upon a particular implementation and embodiments are not limited to any particular elements.

Figure 3A:
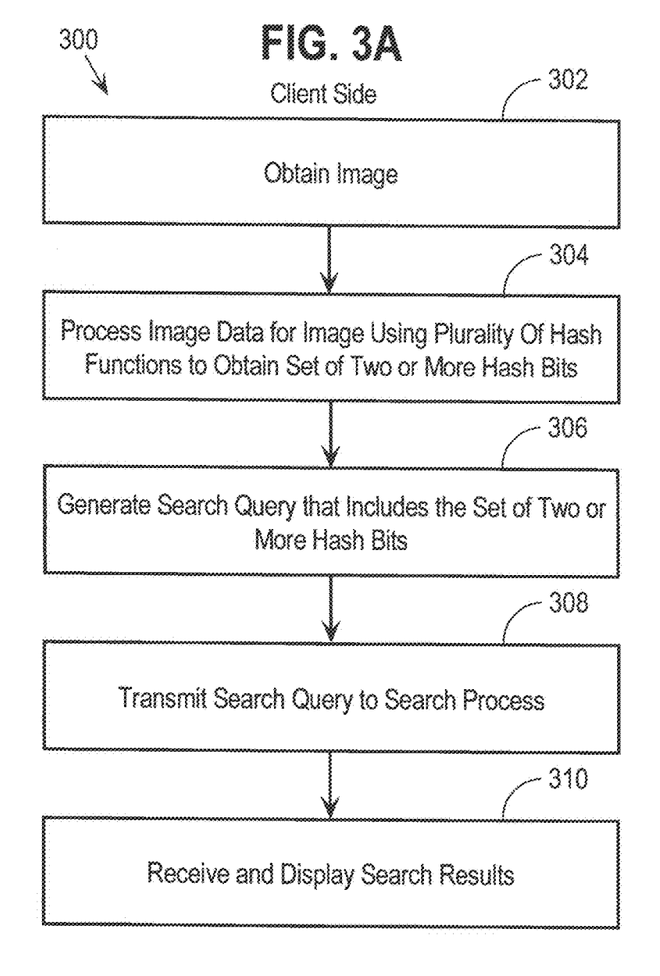
FIG. 3A is a flow diagram that depicts a client-side approach for performing a mobile visual search.

FIG. 3A is a flow diagram 300 that depicts a client-side approach for performing a mobile visual search according to an embodiment. In step 302, an image to be used in a mobile visual search is obtained. For example, a user of mobile device 202 may acquire an image using a camera feature of mobile device 202. As another example, a user of mobile device 202 may retrieve an existing image either from mobile device 202 or from a source external to mobile device 202.

In step 304, the image data for the image is processed using deep variant coding to generate a set of two or more hash bits for the image. According to one embodiment, the image data for the image is processed using a plurality of hash functions to generate the two or more hash bits. Each bit represents a result of applying one of the hash functions and any number of hash functions from the plurality of hash functions may be used, depending upon the results of logic that is used to apply the hash functions. For example, the result of applying a first hash function may indicate that a second hash function is to be applied. The results of the second hash function may indicate that a third hash function is to be applied. This process continues until the results of applying a hash function indicate that the process is complete and no further hash functions need to be applied. Thus, the number of hash bits for a particular image may vary depending upon the content of the particular image. The plurality of hash functions defines a plurality of hash buckets and the resulting two or more hash bits uniquely identify a particular hash bucket from the plurality of hash buckets.

In step 306, a search query is generated that includes the set of two or more hash bits. For example, search query process 208 may generate a visual search query that includes the set of two or more hash bits determined for the image in step 304. In step 308, the search query is transmitted to a search process. For example, search query process 208 may cause the search query that includes the set of two or more hash bits determined for the image in step 304 to be transmitted to search process 214 on search server 204.

In step 310, search results are received and displayed. For example, search query process 208 may receive search results from search process 214 and cause the search results to be displayed on a display of mobile device 202. The search results indicate and/or include one or more images that are determined to be similar to the image acquired in step 302.

Figure 3B:
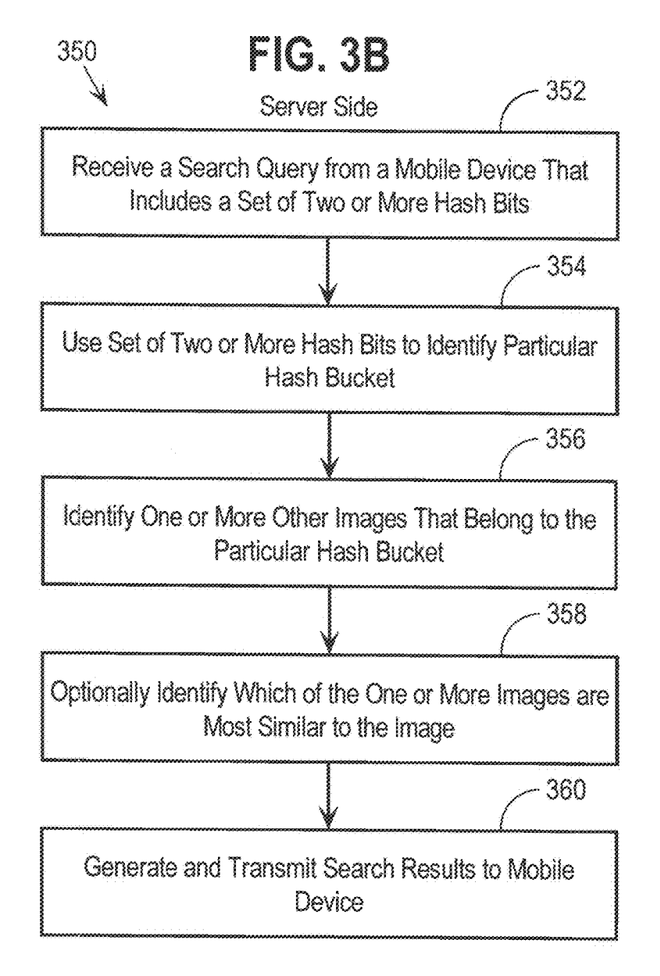
FIG. 3B is a flow diagram that depicts a server-side approach for performing a mobile visual search.

FIG. 3B is a flow diagram 350 that depicts a server-side approach for performing a mobile visual search according to an embodiment. In step 352, a search query is received from a mobile device and the search query includes the set of two or more hash bits that were generated when the original image was processed using deep variant coding. For example, search process 214 may receive a mobile visual search query from search query process 208.

In step 354, the set of two or more hash bits are used to identify a particular hash bucket from a plurality of hash buckets. For example, search process 214 may use the set of two or more hash bits included in the mobile visual search query received from search query process 208 to identify a particular hash bucket from a plurality of available hash buckets. The plurality of hash functions define the plurality of hash buckets and the two or more hash bits included in the mobile search query uniquely identify the particular hash bucket from the plurality of hash buckets.

In step 356, one or more other images that belong to the particular hash bucket, i.e., the hash bucket in which the query image is contained, are identified. In step 358, optionally an identification is made of which of the one or more images from the particular hash bucket are most similar to the query image. This may be performed, for example, using various types of similarity analyses for determining similar images.

In step 360, search results that identify and/or include the one or more other images, or optionally the most similar images, are generated and transmitted to the mobile device. For example, search process 214 may generate and transmit the search results to search query process 208.

III. Deep Variant Coding (DVC) Framework

A. Overview

Figure 4:
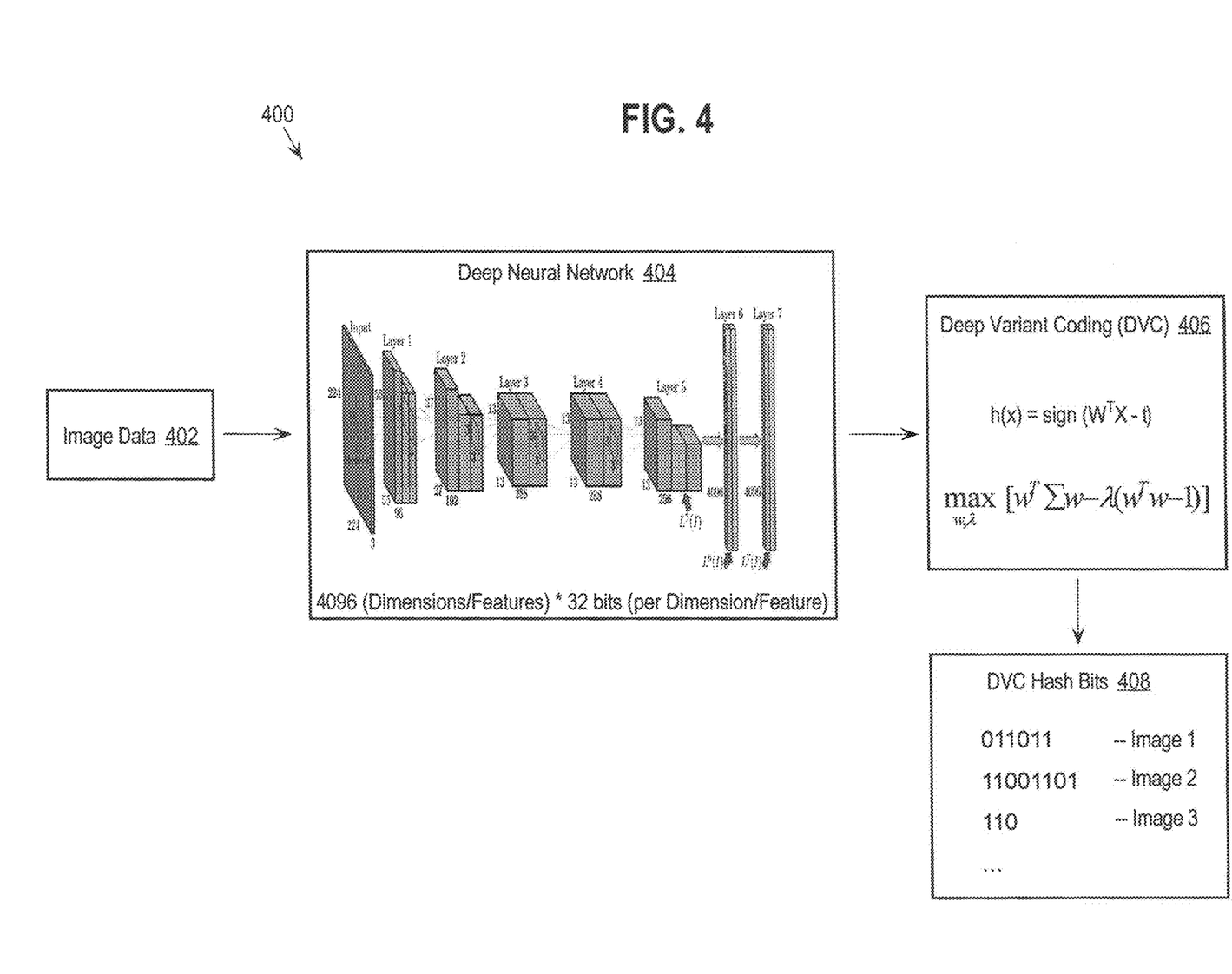
FIG. 4 depicts a deep variant coding (DVC) framework.

FIG. 4 depicts a deep variant coding (DVC) framework 400 according to an embodiment. Image data 402 is processed by a deep neural network 404 to extract deep features for each image. Deep variant coding 406 is used to encode the features into M number of DVC hash bits 408, where M is variant for each image, as described in more detail hereinafter. Multiple hash tables may be used to increase retrieval accuracy. In general, the use of DVC indexing involves randomly partitioning a high-dimensional space into high-dimensional cubes, where each cube is a hash bucket. A point, i.e., an image, is likely to be located in the same hash bucket as its nearest neighbor, i.e., the most similar image. Given a query point, i.e., a query image, from mobile device, a hash bucket that contains the query image is determined based upon the DVC bit stream for the query image contained in the query. A linear search is then performed within the hash bucket to find the nearest neighbor, i.e., the most similar image, which is identified and/or returned in search results. Alternatively, all of the images in the same hash bucket may be identified and/or returned in the search results. This approach provides very fast image retrieval with high accuracy. On the client (mobile) side, each deep feature in the query image is encoded into M bits by the same DVC and the hash bits for all the local features are included in a search query that is sent to a search process. Since the overall hash code is less than 1-10 KB (depending on the number of hash table used), the transmission cost is small.

B. Deep Neural Network

1. Training

A convolutional neural network is used as a base deep neural network. E-commerce product images with their corresponding labels, i.e., product categories, are used to train the network and obtain the model parameters. More specifically, the deep neural network is trained by processing millions of e-commerce product images, with their corresponding categories as their label, which have been preprocessed by subtracting from each pixel its mean value over all images and then dividing by the standard deviation of all pixels over all images, through a deep convolution network. The deep convolutional network includes five convolutional layers, each including a convolution, a rectified linear (ReLU) transform (f(x)=max(x, 0)), and a max pooling transform (layers 1, 2, and 2). At the top of the architecture are three fully connected layers (layer 6, layer 7, layer 8), which take as an input the output of the previous layer, multiply it by a matrix, and, in the case of layers 6, and 7 applies a rectified linear transform. The network is trained so that the layer 8 output corresponds to the product category label. The softmax loss is used during training 2. Deep Feature Extraction For each test image, the previously-trained deep neural network processes a test image at a specific size (e.g., 227×227×3) with the mean subtracted. Features are calculated by forward propagation through five convolutional layers and two fully connected layers. Each of the high-dimensional vectors (e.g., layer 6 and layer 7) represents a high-level description of the input image, and layer 7 is used as the deep descriptor. Finally, a 4096 dimensional feature vector is extracted from the entire product image in this stage.

C. Deep Variant Coding (DVC)

The DVC approach uses a similarity preserving hash called DVC to: (i) compress each local feature in the query image to low bits, and (ii) build an efficient indexing structure for large scale image search at the same time. According to the DVC approach, similar samples are mapped to the same hash bucket with high probability. In other words, the property of locality in the original space will be largely preserved in the hamming space. In contrast, traditional hash methods like local sensitivity hashing (LSH) uses random projections to generate hash bits. The random vector is data-independent, although there exists an asymptotic theoretical guarantee for random projection based LSH, it is not very efficient in practice since it requires multiple tables with very long codes to achieve the sample locality preserving goal. Unlike traditional hash methods, the DVC approach uses several strategies to enhance the hash performance. More specifically, for any local feature x, where x is a 4096 dimension vector when using deep features, one hash bit for x is obtained by:

$$h(x) = \text{sign}(w^T x - t) \qquad (1)$$

In this case, w is a projection vector in the feature space and t is a threshold scalar. For each component of the hash function, the following strategies may be used to optimize the hash performance.

1. Uniform Data Projection for w

Figure 5:
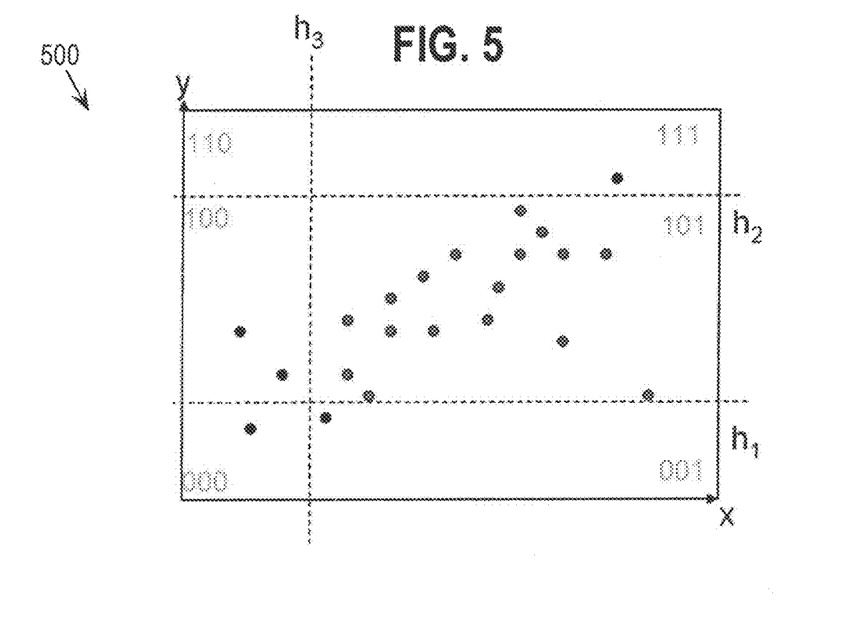
FIG. 5 is a diagram that depicts an example two-dimensional feature space in which the points, e.g., images, are denser in the Y direction than in the X direction.

In real datasets, points may be denser in one dimension compared to another. For example, in the case of an ecommerce product search, some features may be more sensitive than others in differentiating products. FIG. 5 is a diagram that depicts an example two-dimensional feature space 500 in which the points, e.g., images, are denser in the Y direction than in the X direction. Using a traditional approach of random projection and three hash functions ($h_1$, $h_2$, $h_3$) results in extremely unbalanced hash buckets, identified in FIG. 5 as 000, 001, 100, 101, 110 and 111. For example, in the two-dimensional feature space 500 of FIG. 5, more than 80% of the points, e.g., images, are contained in hash bucket 101. Hash buckets 110 contains no images and hash buckets 000, 001 and 111 contain only a single image. The unbalanced hash buckets lead to a significant growth in search time for some queries because the large number of images in hash bucket 101 will require many more comparisons to be made to find the most similar image(s).

According to one embodiment of the DVC approach, the data is transformed to a new coordinate system so that the greatest variance by some projection of the data comes to lie on the selected coordinates. The resulting feature space partitions the data more evenly and effectively, i.e., the images are more evenly distributed across the hash buckets. More formally, a linear function wTx of the element x having the maximum variance is determined:

$$\max_{w, \lambda} [w^T \Sigma w - \lambda(w^T w - 1)] \quad (2)$$

Figure 6:
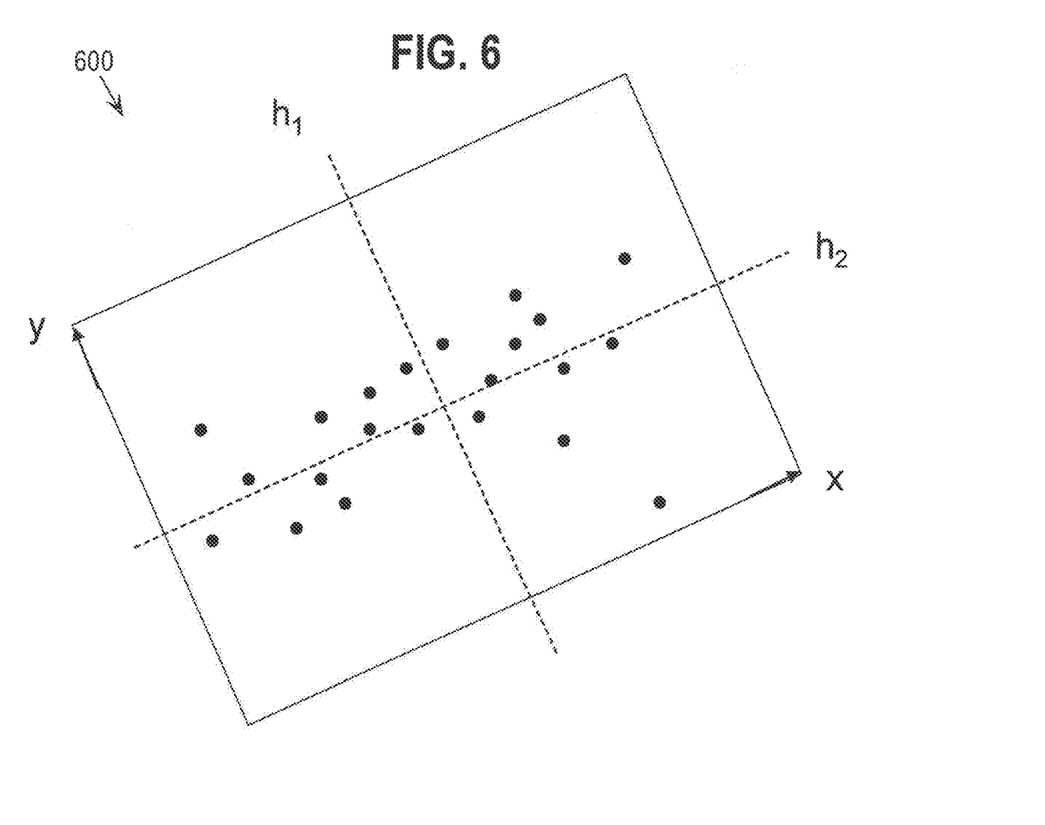
FIG. 6 is a diagram that depicts an example uniform data projection using the DVC approach in which directions having a maximum variance are determined.

This may be accomplished using various methods, e.g., singular value decomposition (SVD)), where w1, the largest eigenvector corresponding to $\hat{l} \gg 1$ (the largest eigenvalue of i£), is the project direction with maximum variance. The second greatest variance on the second coordinate can be similarly determined, and so on (i.e., wi) to serve as the projection vectors and the basic hash functions. Furthermore, balancing hash bits will often improve the search performance, so choose t is chosen in formula (1) as the median value at the first time of chosen a specific direction wi such that half of each bit are +1, and the other are −1. FIG. 6 is a diagram that depicts an example uniform data projection using the DVC approach in which directions having a maximum variance are determined. As depicted in FIG. 6, the samples, i.e., images, are more evenly distributed among the four hash buckets and only two hash functions ($h_1$, $h_2$) are used. Finally each 4096-dimension deep feature (totally cost 4096 dim*each 32 bits>131,000 bits per point) is mapped to k-bits by the selected k project directions.

2. Variant-Length Coding

Figure 7A:
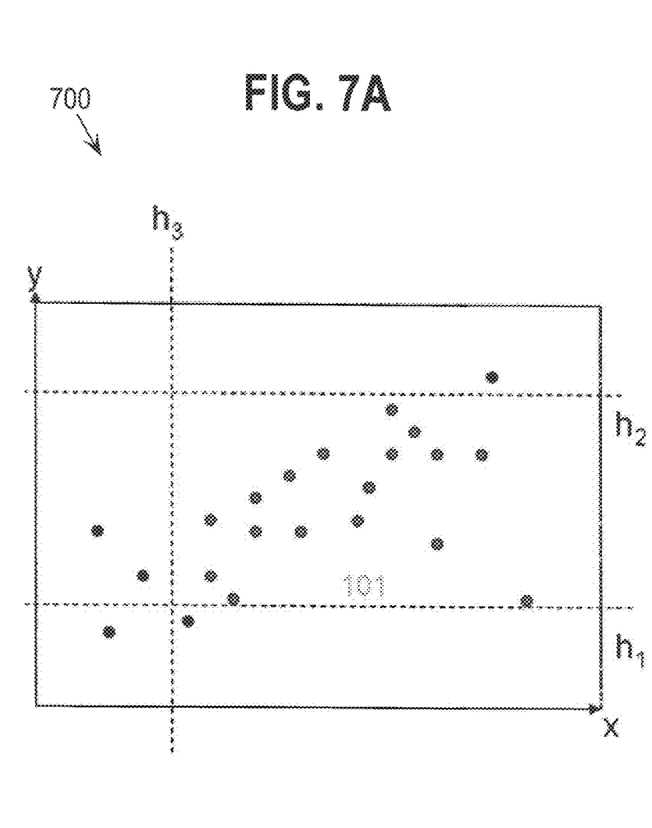
FIG. 7A depicts an example two-dimensional feature space in which the points, e.g., images, are denser in the Y direction than in the X direction and the number of points, e.g., images, in hash bucket 101 is large compared to the other hash buckets defined by hash functions ($h_1$, $h_2$, $h_3$).
Figure 7B:
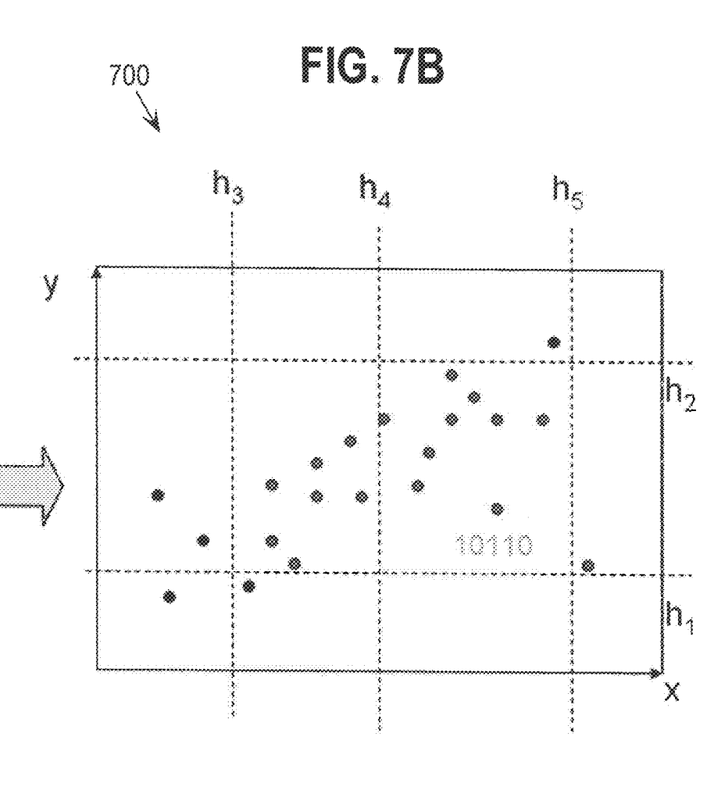
FIG. 7B depicts two-dimensional feature space where the number of hashed dimensions k is increased from three to five ($h_1$, $h_2$, $h_3$, $h_4$, $h_5$).

In most cases, the real dataset is not uniformly distributed. For example, FIG. 7A depicts an example two-dimensional feature space 700 in which the points are denser in the Y direction than in the X direction and the number of points in hash bucket 101 is large compared to the other hash buckets defined by hash functions ($h_1$, $h_2$, $h_3$). Searching for a similar image in hash bucket 101 will involve many image comparisons, thus reducing the efficiency of the hash. FIG. 7B depicts two-dimensional feature space 700, where the number of hashed dimensions k is increased from three to five ($h_1$, $h_2$, $h_3$, $h_4$, $h_5$). This reduces the number of points in each hash bucket. For example, as depicted in FIG. 7B, hash bucket 10110 has many fewer points, e.g., images, than hash bucket 101 of FIG. 7A. This approach, however, increases the number of hash bits linearly for every point, meaning that each point or image is represented by five bits instead of three bits (one bit per hash function).

Figures 8A, 8B:
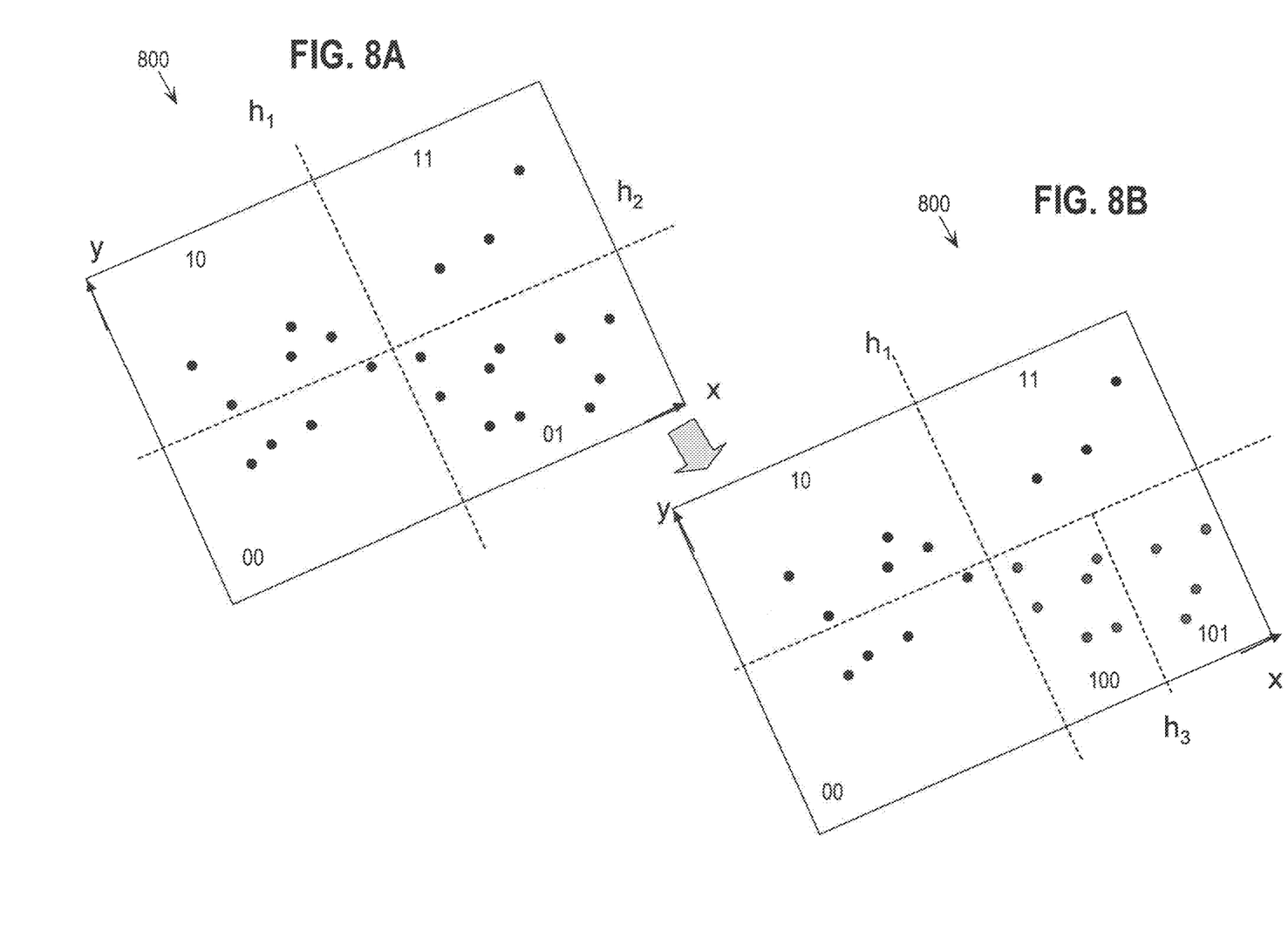
FIG. 8A depicts an example two-dimensional feature space in which the data has been transformed to a new coordinate system to more evenly distribute the points, e.g., images, across the four hash buckets (00, 01, 10, 11) defined by the two hash functions ($h_1$, $h_2$).
FIG. 8B depicts the two-dimensional feature space in which hash bucket 01 of FIG. 8A has been partitioned into two hash buckets 100 and 101 by applying an additional hash function $h_3$ to the points, e.g., images, contained in hash bucket 01.

FIG. 8A depicts an example two-dimensional feature space 800 in which the data has been transformed to a new coordinate system, as previously described herein, to more evenly distribute the points, e.g., images, across the four hash buckets (00, 01, 10, 11) defined by the two hash functions ($h_1$, $h_2$). According to one embodiment, when the number of points contained in a particular hash bucket exceeds a specified threshold, the particular hash bucket is selectively partitioned, i.e., an additional hash function is applied to the particular hash bucket, and the points contained in the particular hash bucket are re-hashed. The threshold may be determined so that the number of image comparisons, e.g., average, maximum, etc., provides an adequate level of performance, at the cost of additional bits for the points, e.g., images, contained in the newly-partitioned hash bucket. In the present example, a determination is made that the number of points, e.g., images, contained in hash bucket 01 exceeds the specified threshold.

FIG. 8B depicts the two-dimensional feature space 800 in which hash bucket 01 of FIG. 8A has been partitioned into two hash buckets 100 and 101 by applying an additional hash function $h_3$ to the points, e.g., images, contained in hash bucket 01. This process may be repeated as many times as necessary until the number of points, e.g., images, in each hash bucket is less than the specified threshold. This approach establishes a hierarchy of hash tables in dense areas of a feature space and reduces the size of overall hash bits, since only the points, e.g., images, contained in dense hash buckets will need additional coding bits. In the example depicted in FIG. 8B, points, e.g., images in hash buckets 00, 10 and 11 are encoded using two bits, while points, e.g., images in hash buckets 100 and 101 are encoded using three bits.

3. Multi-Hash Tables and Multi-Probing

There may be situations where a nearest neighbor, i.e., a similar image, may be missed if the similar image has been hashed to a different hash bucket than its nearest neighbor. For example, using the variant encoding approach previously described herein, two points, e.g., images, that were adjacent to each other in a particular hash bucket may be contained in two different hash buckets after the particular hash bucket is partitioned into two hash buckets. According to one embodiment, an LSH approach is used to address this situation. According to this approach, multiple hash tables are maintained and each point, e.g., image, is hashed multiple times using different hash functions. The probability that a point, e.g., an image, and its nearest neighbor are hashed into different hash buckets for all these hash functions can be reduced by reducing the number of hash buckets and increasing the number of hash tables. According to another embodiment, multiple hash buckets in each hash table within a specified Hamming distance, e.g., nearby hash buckets, are probed when searching for the nearest neighbor, instead of just using a linear scan over the hash bits.

Figure 9:
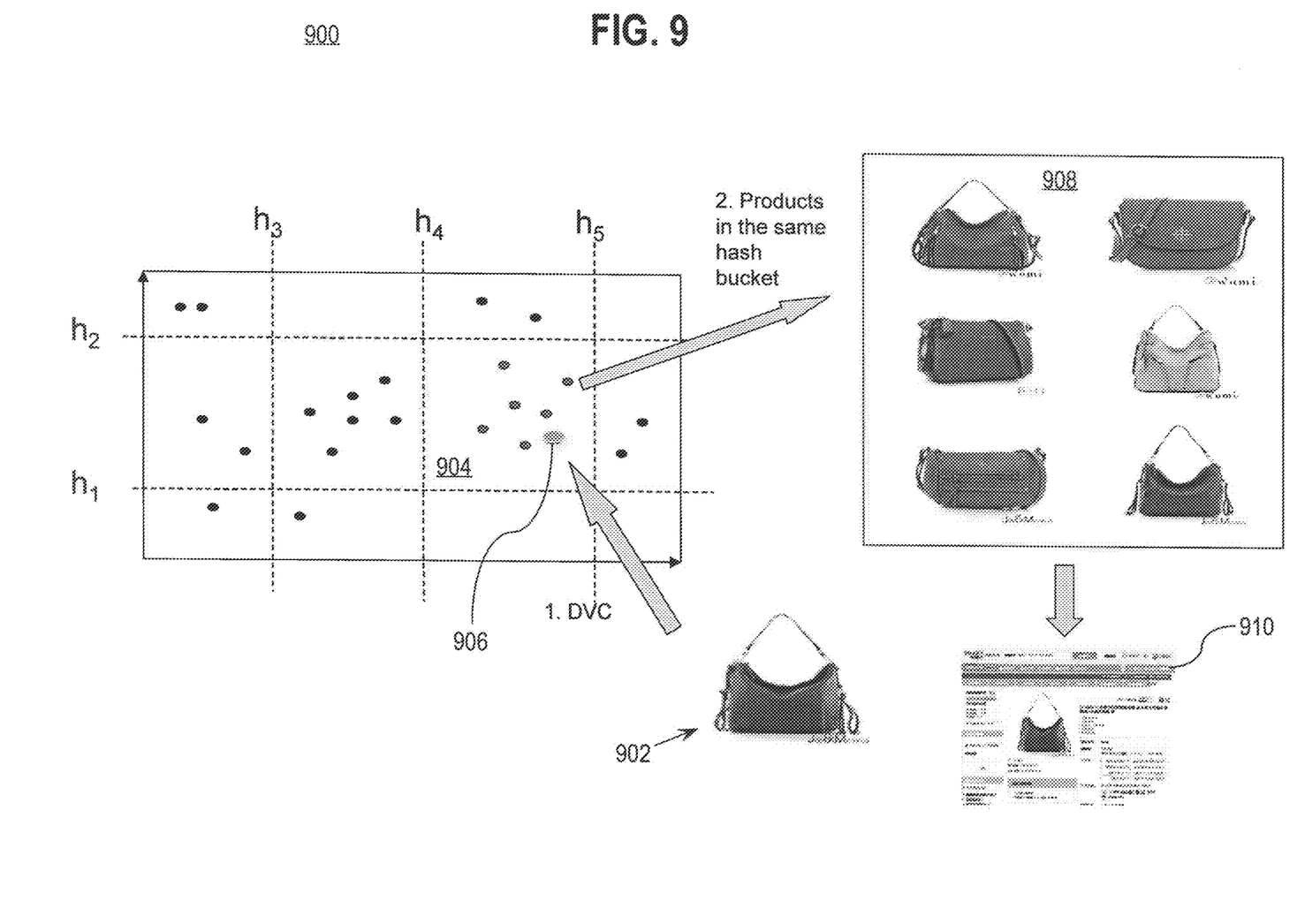
FIG. 9 is a diagram that depicts an example implementation of the approaches described herein for performing mobile visual searching in the context of online shopping.

FIG. 9 is a diagram that depicts an example implementation of the approaches described herein for performing mobile visual searching in the context of online shopping. A user of a mobile device acquires or selects an image 902 of a handbag. In this example, it is presumed that the user is interested in information about the handbag and/or interested in purchasing the handbag. The mobile device generates a search query using deep variant coding (DVC) as previously described herein. This includes encoding image 902 using five hash functions ($h_1$-$h_5$) and the resulting DVC bit stream for the image is included in the search query. The mobile device transmits the search query to a search process that determines, based upon the DVC bit stream for the image included in the search query, that the image 902 is contained in hash bucket 904, as indicated by reference numeral 906. The other images 908 included in hash bucket 904 are all potentially included in search results since they are in the same hash bucket 904 as image 902 and are therefore similar to image 902. In the present example, one of the other images 908 is selected, for example by voting using metadata or other information associated with the other images 908 and included in a search results page 910 that is returned to the mobile device.

The approaches described herein provide several benefits over prior approaches. First, as previously described herein, the approach consumes very little storage and computational resources on mobile devices by storing tens of vectors with the same dimension of the local feature and tens of inner products for each local feature. The approach also significantly reduces the amount of data that needs to be included in a search query, compared to prior approaches that transmitted JPEG or floating point (i.e., local feature) data over a communications link to a search process, without loss in matching accuracy. The novel mobile visual searching approach described herein may increase traffic to ecommerce website and increase click-through rates. Finally, the approach may be automated, reducing or eliminating labor costs.

IV. Implementation Mechanisms

Although the flow diagrams of the present application depict a particular set of steps in a particular order, other implementations may use fewer or more steps, in the same or different order, than those depicted in the figures.

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 10:
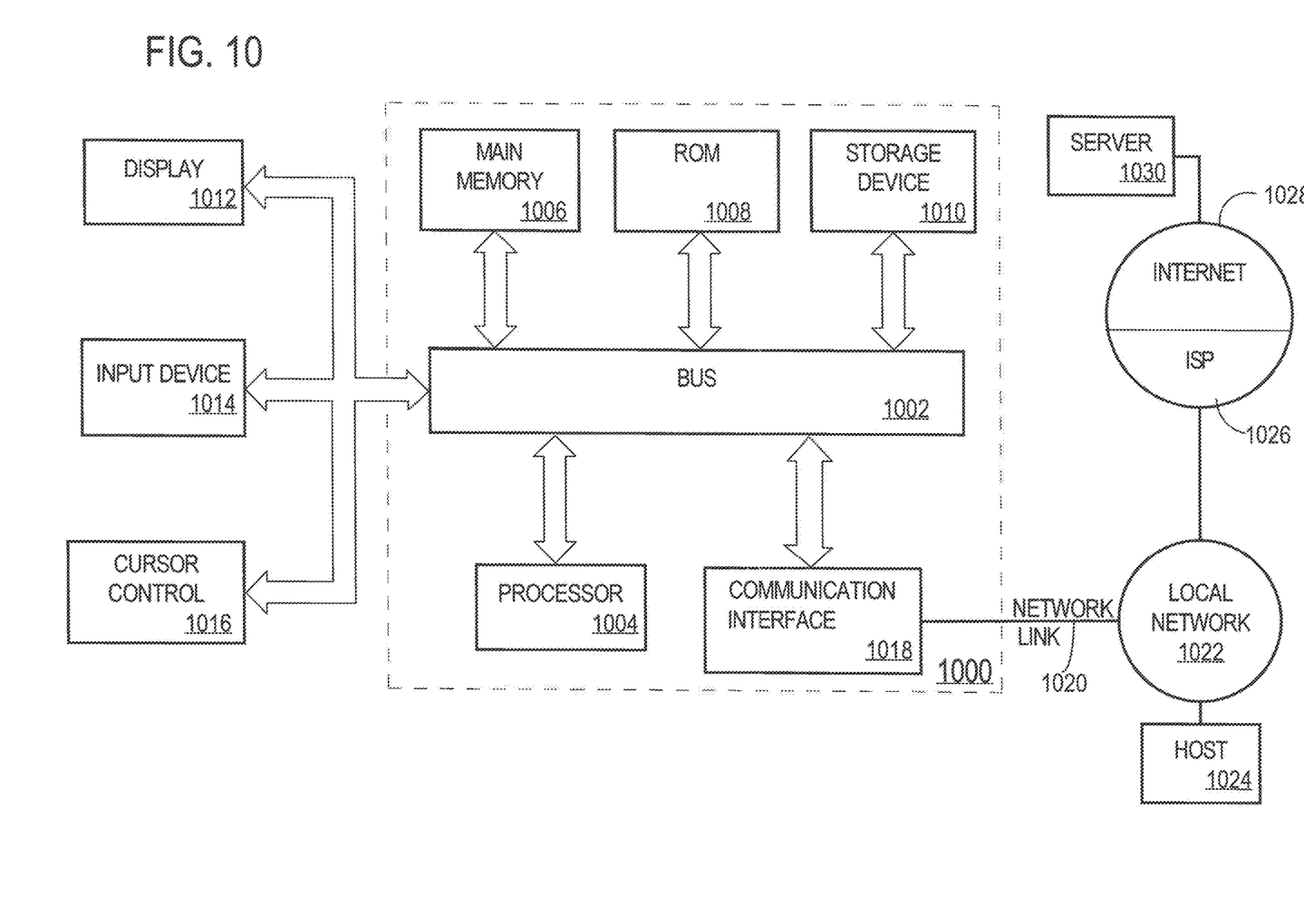
FIG. 10 is a block diagram of a computer system on which embodiments may be implemented.

FIG. 10 is a block diagram that depicts an example computer system 1000 upon which embodiments may be implemented. Computer system 1000 includes a bus 1002 or other communication mechanism for communicating information, and a processor 1004 coupled with bus 1002 for processing information. Computer system 1000 also includes a main memory 1006, such as a random access memory (RAM) or other dynamic storage device, coupled to bus 1002 for storing information and instructions to be executed by processor 1004. Main memory 1006 also may be used for storing temporary variables or other intermediate information during execution of instructions to be executed by processor 1004. Computer system 1000 further includes a read only memory (ROM) 1008 or other static storage device coupled to bus 1002 for storing static information and instructions for processor 1004. A storage device 1010, such as a magnetic disk or optical disk, is provided and coupled to bus 1002 for storing information and instructions.

Computer system 1000 may be coupled via bus 1002 to a display 1012, such as a cathode ray tube (CRT), for displaying information to a computer user. Although bus 1002 is illustrated as a single bus, bus 1002 may comprise one or more buses. For example, bus 1002 may include without limitation a control bus by which processor 1004 controls other devices within computer system 1000, an address bus by which processor 1004 specifies memory locations of instructions for execution, or any other type of bus for transferring data or signals between components of computer system 1000.

An input device 1014, including alphanumeric and other keys, is coupled to bus 1002 for communicating information and command selections to processor 1004. Another type of user input device is cursor control 1016, such as a mouse, a trackball, or cursor direction keys for communicating direction information and command selections to processor 1004 and for controlling cursor movement on display 1012. This input device typically has two degrees of freedom in two axes, a first axis (e.g., x) and a second axis (e.g., y), that allows the device to specify positions in a plane.

Computer system 1000 may implement the techniques described herein using customized hard-wired logic, one or more ASICs or FPGAs, firmware and/or program logic or computer software which, in combination with the computer system, causes or programs computer system 1000 to be a special-purpose machine. According to one embodiment, those techniques are performed by computer system 1000 in response to processor 1004 processing instructions stored in main memory 1006. Such instructions may be read into main memory 1006 from another computer-readable medium, such as storage device 1010. Processing of the instructions contained in main memory 1006 by processor 1004 causes performance of the functionality described herein. In alternative embodiments, hard-wired circuitry may be used in place of or in combination with software instructions to implement the embodiments. Thus, embodiments are not limited to any specific combination of hardware circuitry and software.

The term "computer-readable medium" as used herein refers to any medium that participates in providing data that causes a computer to operate in a specific manner. In an embodiment implemented using computer system 1000, various computer-readable media are involved, for example, in providing instructions to processor 1004 for execution. Such a medium may take many forms, including but not limited to, non-volatile media and volatile media. Non-volatile media includes, for example, optical or magnetic disks, such as storage device 1010. Volatile media includes dynamic memory, such as main memory 1006. Common forms of computer-readable media include, without limitation, a floppy disk, a flexible disk, hard disk, magnetic tape, or any other magnetic medium, a CD-ROM, any other optical medium, a RAM, a PROM, and EPROM, a FLASH-EPROM, any other memory chip, memory cartridge or memory stick, or any other medium from which a computer can read.

Various forms of computer-readable media may be involved in storing instructions for processing by processor 1004. For example, the instructions may initially be stored on a storage medium of a remote computer and transmitted to computer system 1000 via one or more communications links. Bus 1002 carries the data to main memory 1006, from which processor 1004 retrieves and processes the instructions. The instructions received by main memory 1006 may optionally be stored on storage device 1010 either before or after processing by processor 1004.

Computer system 1000 also includes a communication interface 1018 coupled to bus 1002. Communication interface 1018 provides a communications coupling to a network link 1020 that is connected to a local network 1022. For example, communication interface 1018 may be a modem to provide a data communication connection to a telephone line. As another example, communication interface 1018 may be a local area network (LAN) card to provide a data communication connection to a compatible LAN. Wireless links may also be implemented. In any such implementation, communication interface 1018 sends and receives electrical, electromagnetic or optical signals that carry digital data streams representing various types of information.

Network link 1020 typically provides data communication through one or more networks to other data devices. For example, network link 1020 may provide a connection through local network 1022 to a host computer 1024 or to data equipment operated by an Internet Service Provider (ISP) 1026. ISP 1026 in turn provides data communication services through the world wide packet data communication network now commonly referred to as the "Internet" 1028.

Local network 1022 and Internet 1028 both use electrical, electromagnetic or optical signals that carry digital data streams.

Computer system 1000 can send messages and receive data, including program code, through the network(s), network link 1020 and communication interface 1018. In the Internet example, a server 1030 might transmit a requested code for an application program through Internet 1028, ISP 1026, local network 1022 and communication interface 1018. The received code may be processed by processor 1004 as it is received, and/or stored in storage device 1010, or other non-volatile storage for later execution.

In the foregoing specification, embodiments have been described with reference to numerous specific details that may vary from implementation to implementation. Thus, the sole and exclusive indicator of what is, and is intended by the applicants to be, the invention is the set of claims that issue from this application, in the specific form in which such claims issue, including any subsequent correction. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A server for executing a search process, the server comprising:
    one or more processors; and
    one or more memories communicatively coupled to the one or more processors, wherein the one or more processors are configured to:
    receive from a mobile device over one or more communications networks, a search query that includes a plurality of hash bits that represent results of processing image data for an image with a plurality of hash functions, wherein a number of hash bits in the plurality of hash bits is determined based on the content of the image data for the image,
    determine, based on the plurality of hash bits and a partitioning criterion, whether a hash bucket of a hash feature space is to be sub-divided into a plurality of sub-buckets, wherein the plurality of hash bits of the image fall into one of the plurality of sub-buckets,
    identify, in response to a successful determination that the hash bucket is to be sub-divided, an additional hash function that provides a substantially even distribution of images with respect to each of the plurality of sub-buckets, wherein the plurality of hash functions and the additional hash function form a hash hierarchy which indicates a number of hash bits used to encode each image in the hash feature space,
    identify one or more other images that have their corresponding hash bits belonging to the one sub-bucket, and
    transmit, to the mobile device over the one or more communications networks, search results that identify the one or more other images that belong to the one sub-bucket.

2. The server of claim 1, wherein the search results include at least one of the one or more other images that belong to the one sub-bucket.

3. The server of claim 1, wherein
a particular image from the one or more other images that belong to the one sub-bucket is determined to be similar to the image represented by the plurality of hash bits included in the search query, and the search results include data that at least identifies the particular image.

4. The server of claim 1, wherein image data for a plurality of images that includes the one or more other images is transformed to a new coordinate system to increase variance of images contained in the plurality of hash buckets.

5. The server of claim 1, wherein the plurality of hash functions is determined using principle component analysis to obtain a maximum variance between hash buckets from the plurality of hash buckets defined by the plurality of hash functions.

6. The server of claim 1, wherein the search process is further configured to:
    identify one or more nearby hash buckets within a specified Hamming distance of the hash bucket,
    identify one or more images contained in the one or more nearby hash buckets that are similar to the image, and
    including, in the search results, the one or more images contained in the one or more nearby hash buckets that are similar to the image.

7. The server of claim 1, wherein the partitioning criterion corresponds to a number of images having their corresponding hash bits belonging to the hash bucket, exceeding a predetermined threshold.

8. The server of claim 4, wherein image data for the plurality of images is transformed to the new coordinate system based on singular value decomposition.

9. A method, implemented on a machine having at least one processor, storage, and a communication platform connected to a network for executing a search process, the method comprising:
    receiving from a mobile device over one or more communications networks, a
    search query that includes a plurality of hash bits that represent results of processing image data for an image with a plurality of hash functions, wherein a number of hash bits in the plurality of hash bits is determined based on the content of the image data for the image;
    determining, based on the plurality of hash bits and a partitioning criterion, whether a hash bucket of a hash feature space is to be sub-divided into a plurality of sub-buckets, wherein the plurality of hash bits of the image fall into one of the plurality of sub-buckets;
    identifying, in response to a successful determination that the hash bucket is to be sub-divided, an additional hash function that provides a substantially even distribution of images with respect to each of the plurality of sub-buckets, wherein the plurality of hash functions and the additional hash function form a hash hierarchy which indicates a number of hash bits used to encode each image in the hash feature space;
    identifying one or more other images that have their corresponding hash bits belonging to the one sub-bucket; and
    transmitting, to the mobile device over the one or more communications networks, search results that identify the one or more other images that belong to the one sub-bucket.

10. The method of claim 9, wherein the search results include at least one of the one or more other images that belong to the one sub-bucket.

11. The method of claim 9, wherein image data for a plurality of images that includes the one or more other images is transformed to a new coordinate system to increase variance of images contained in the plurality of hash buckets.

12. The method of claim 9, further comprising:
identifying one or more nearby hash buckets within a specified Hamming distance of the hash bucket,
identifying one or more images contained in the one or more nearby hash buckets that are similar to the image, and
including, in the search results, the one or more images contained in the one or more nearby hash buckets that are similar to the image.

13. The method of claim 11, wherein image data for the plurality of images is transformed to the new coordinate system based on singular value decomposition.

\* \* \* \* \*